July 3, 1962 J. A. BALVIN ETAL 3,042,281

ROLLER

Filed Aug. 20, 1959 2 Sheets-Sheet 1

INVENTORS
W. FRED HEINE
JOSEPH A. BALVIN
BY
Kenyon & Kenyon
ATTORNEYS

July 3, 1962 J. A. BALVIN ETAL 3,042,281

ROLLER

Filed Aug. 20, 1959 2 Sheets-Sheet 2

INVENTORS
W. FRED HEINE
JOSEPH A. BALVIN
BY
Kenyon & Kenyon
ATTORNEY

United States Patent Office 3,042,281

Patented July 3, 1962

3,042,281

ROLLER

Joseph A. Balvin, Hicksville, and Wolfgang Fredrick Heine, Huntington Station, N.Y., assignors to Mohawk Business Machines Corporation, Brooklyn, N.Y., a corporation of Maryland Filed Aug. 20, 1959, Ser. No. 835,054

4 Claims. (Cl. 226—181)

This invention relates particularly to drive mechanisms for tape recorders. More particularly, this invention relates to an improvement in the roller of the drive mechanism.

In drive mechanisms on tape recorders, the tape is driven in most machines by a pair of rollers. One of these rollers is called capstan and is the actual driver. This roller is normally a smoothly machined metallic shaft. The second roller is called the pinch-roller or pressure roller and serves to press the tape against the capstan. The pinch-roller is generally made out of a soft resilient material such as neoprene.

During operation of the tape recorder, the tape is many times taken up on a take-up reel that is driven either by a separate motor or through a slipping clutch by the capstan motor. In recorders that do not use a conventional take-up reel as described above, but instead use an endless cartridge, the tape has to leave the capstan or pinch-roller more or less by itself because there is no pull exerted on it by a take-up reel. With this arrangement, trouble many times occurs because the tape tends to stick to the pinch-roller. If the tape sticks to the pinch-roller rather than moving smoothly, and revolves with the pinch-roller for one full turn, the machine must be stopped and the tape untangled. This tendency of the tape to stick to the roller and become tangled has adversely effected the sale of tape recorders using endless tape cartridges because of the reluctance on the part of the operator to having his recording interrupted and also necessitating his untangling the tape.

It is an object of this invention to eliminate the tendency of the tape to stick on the pinch-roller.

It is another object of this invention to provide for the free running of the tape when an endless tape cartridge is employed.

It is another object of this invention to provide an improved roller.

These and other objects of this invention will become apparent from the following description.

According to this invention there is provided an improved roller having a groove therein and having disposed thereon an eccentrically fitted ring, the outside diameter of which is larger than the diameter of the roller.

The ring fits loosely around the groove in the circumference of the roller and since the outside diameter of the ring is larger than the diameter of the roller, the ring will run eccentrically to the roller and lift the tape off the roller should it stick to the roller.

The roller usually is made of a soft material such as neoprene and the ring is preferably made from a material compatible therewith such that the ring will fit loosely in the roller groove and will rotate with the roller. A split steel ring which is easily snapped into the groove in the roller is preferred.

The roller of this invention is particularly useful in a tape recorder having a capstan and a pinch-roller. The improved roller of this invention serves as the pinch-roller and functions so as to lift the tape off the pinch-roller in the event the tape should stick to the roller. In this case the capstan is usually a smoothly machined metallic shaft while the pinch-roller is made of a soft resilient material on to which a ring, preferably a split steel ring, is snapped into place.

The tape recorder need not be limited to the metallic capstan and the soft resilient pinch-roller. The part played by the rollers can be reversed in such a manner that the driving roller is made of the soft resilient material to which the tape tends to stick and which must be equipped with the eccentric ring.

Alternatively, both the capstan and pinch-roller can be made of the soft resilient materials, in which case both rollers will be equipped with eccentric rings.

In another modification of this invention, a tape recorder having a single roller in place of both the capstan and pinch-roller may be employed. This single roller would be constructed such that there would be a large angle of wrap around this roller so as to make the second roller superfluous. In this case the one driving roller would be equipped with the eccentric ring.

While the improved rollers of this invention have been described particularly for use in tape recorders and other magnetic tape-handling apparatus, it should be understood that the invention is not limited thereto. Rather, the invention is applicable to other industries in which band type media are handled by rollers. For a more detailed description of the invention, reference should now be had to the accompanying drawings, in which.

Figure 2:
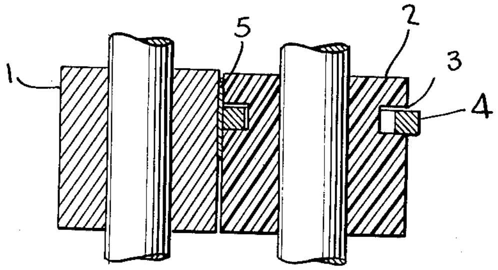
FIGURE 2 shows in cross-section the driving mechanism with the pinch-roller embodying a preferred modification of this invention.
Figure 3:
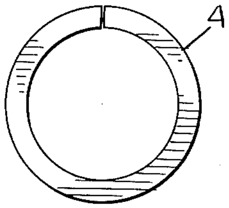
FIGURE 3 shows a preferred modification of the ring of this invention.

Referring first to FIGURE 2, it will be seen that capstan 1 and pinch-roller 2 are disposed such that the recording tape will pass between them. Pinch-roller 2 has a groove 3 preferably near its top and into which ring 4 is inserted. The ring is made of a resilient material and when snapped into the groove is rotatably anchored therein. A more detailed view of a preferred ring is shown in FIGURE 3. The groove may be anywhere on the pinch-roller, the only requirement being that when the ring is inserted in it, the ring will come in contact with the tape and lift the tape off the pinch-roller.

Figure 1:
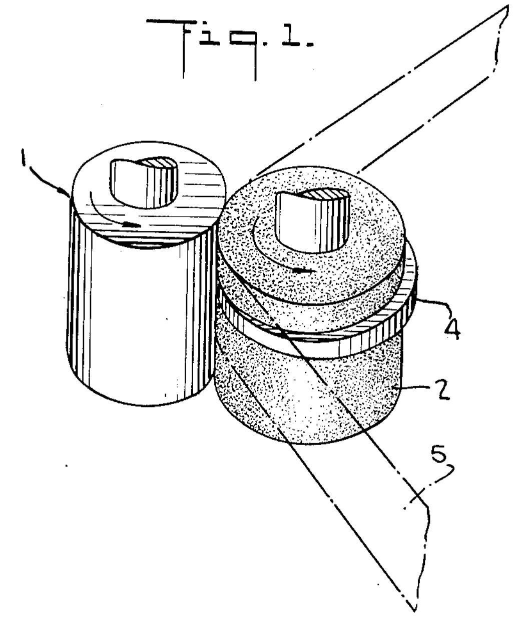
FIGURE 1 shows the driving mechanism with the pinch-roller embodying the invention.

FIGURE 1 shows an assembled driving mechanism with the recording tape 5 passing between the capstan 1 and pinch-roller 2. As the capstan revolves, it pushes the tape forward and against the pinch-roller. Ordinarily the tape would have a tendency to stick to the pinch-roller and follow it during its revolutions. This would cause the tape to become tangled and would force the operator to stop the machine in order to untangle the tape. However, when ring 4 is placed around pinch-roller 2 such that it will run eccentrically to the pinch-roller, the tape will be lifted off the roller 2 by the ring 4 in the event that it sticks to the roller. Both the ring and the roller rotate in the same direction and as the tape is passing between the capstan and pinch-roller, the ring is flush with the pinch-roller. In this position the directly opposite portion of the ring is projected slightly beyond the circumference of the pinch-roller. In the event the tape sticks to the roller, the rotation of the roller will bring the projecting portion of the ring into contact with the tape and will lift the tape off the roller, thereby preventing it from becoming tangled.

Figure 4:
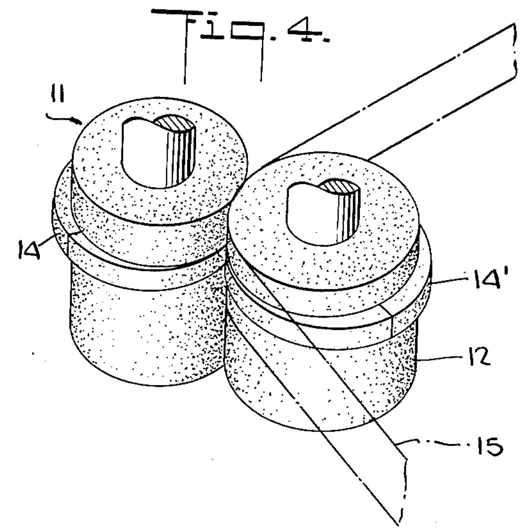
FIGURE 4 shows the driving mechanism with both the pinch-roll and capstan embodying the invention.
Figure 5:
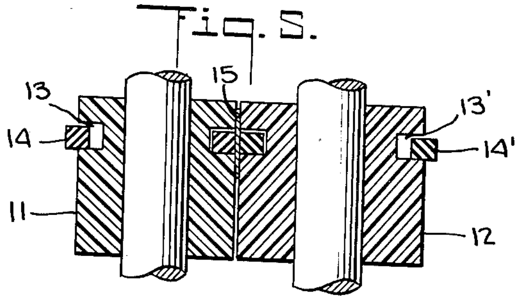
FIGURE 5 shows in cross-section the driving mechanism with both the pinch-roller and capstan embodying the invention.

FIGURES 4 and 5 show a modification of the invention in which both the capstan and pinch-roller can be made of soft resilient materials, in which case both rollers will be equipped with eccentric rings. In this modification the capstan 11 and pinch-roller 12 each have a groove 13 and 13' into which rings 14 and 14' are inserted. The tape 15 is passed between capstan 11 and pinch-roller 12.

Figure 6:
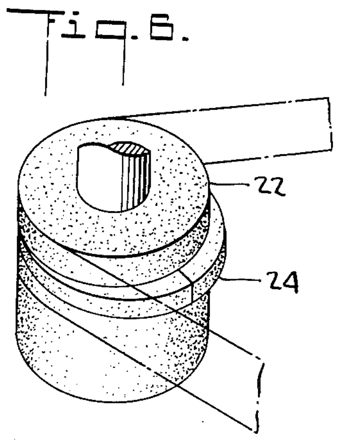
FIGURE 6 shows a modification of the invention in which a single roller is employed in place of both the capstan and pinch-roller.

FIGURE 6 discloses another modification of the invention in which a single roller is employed in place of both the capstan and pinch-roller. In this modification of the invention, the single roller 22 is constructed such that there is a large angle of wrap around the roller so as to make the second roller superfluous. In this case the one driving roller would be equipped with the eccentric ring 24.

Having thus provided a written description of the present invention, it should be understood that no undue restrictions or limitations are to be imposed by reason thereof but that the present invention is defined by the appended claims.

We claim:

1. A self contained assembly comprising a roller having a cylindrical peripheral surface, a circular groove in the cylindrical surface of said roller extending entirely around the periphery thereof and being of uniform depth in all its parts, and a ring positioned within said groove and having a radial thickness no greater than the depth of said groove, said ring having an outside diameter greater than the outside diameter of the cylindrical surface of said roller, and being freely rotatable in said groove whereby upon contact with material, the surface of the ring extends beyond the cylindrical surface of the roller thereby stripping said material from said roller.

2. A self contained assembly according to claim 1 whereby said roller comprises a soft resilient material and said ring is a split steel ring.

3. In a tape recorder, in combination, a capstan rotatably mounted and having a cylindrical peripheral surface whose length parallel to its axis is not less than the approximate width of the tape to be moved in contact with said capstan, a pinch-roller having a cylindrical peripheral surface mounted for rotation in an axis parallel to that of the capstan and positioned to engage the opposite side of a tape moving between the capstan and said pinch-roller, a circular groove in the cylindrical surface of the pinch-roller extending entirely around the periphery thereof and being of uniform depth in all its parts, and a ring positioned within said groove and having a radial thickness not greater than the depth of said groove whereby said ring permits the tape to pass without distortion between the capstan and the pinch-roller, said ring also having an outside diameter greater than the outside diameter of the cylindrical surface of the pinch-roller whereby the surface of the ring extends beyond the cylindrical surface of the pinch-roller as the pinch-roller rotates away from the capstan and thus strips the tape from the pinch-roller as said tape moves away from between the capstan and the pinch-roller.

4. In a tape recorder according to claim 3, said roller being made of a soft resilient material and said ring being made of a split steel ring.

References Cited in the file of this patent

UNITED STATES PATENTS

| | | |
|---|---|---|
| 2,120,735 | Debrie | June 14, 1938 |
| 2,181,314 | Burns | Nov. 28, 1939 |
| 2,329,056 | Keller | Sept. 7, 1943 |
| 2,348,355 | Miller | May 9, 1944 |
| 2,407,239 | Albrecht | Sept. 10, 1946 |
| 2,665,130 | Vermeulen | Jan. 5, 1954 |
| 2,685,960 | Brink et al. | Aug. 10, 1954 |
| 2,769,633 | Krueger | Nov. 6, 1956 |
| 2,951,652 | Rezek et al. | Sept. 6, 1960 |